P. BLOMSTROM.
PULLEY AND SHAFT PROTECTOR.
APPLICATION FILED OCT. 24, 1910.
984,185.
Patented Feb. 14, 1911.
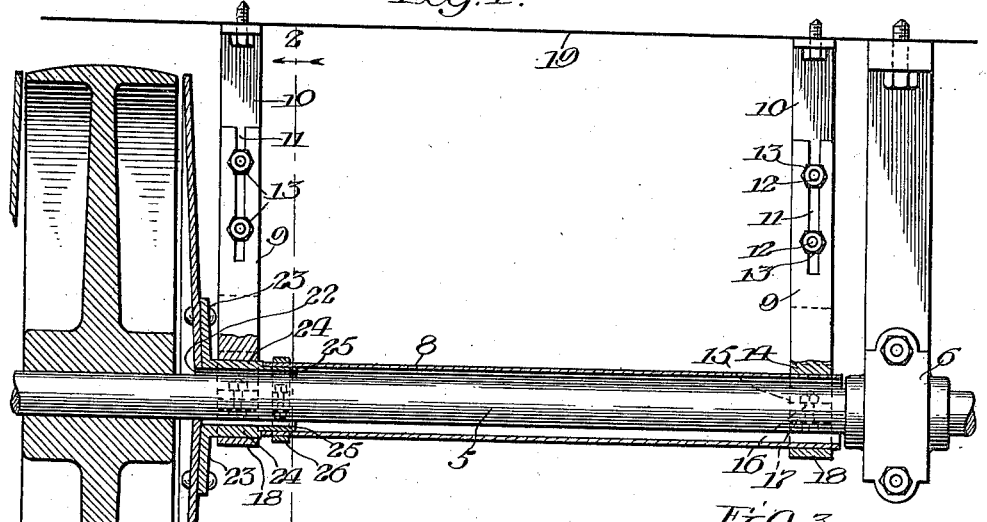

UNITED STATES PATENT OFFICE.

PETER BLOMSTROM, OF WAUKEGAN, ILLINOIS.

PULLEY AND SHAFT PROTECTOR.

984,185.

Specification of Letters Patent. Patented Feb. 14, 1911.

Application filed October 24, 1910. Serial No. 588,837.

*To all whom it may concern:*

Be it known that I, PETER BLOMSTROM, a citizen of the United States, residing at Waukegan, in the county of Lake and State of Illinois, have invented certain new and useful Improvements in Pulley and Shaft Protectors, of which the following is a specification.

This invention relates to improvements in means for protecting pulleys and wheels, as well as the shafting on which they are mounted, in such a manner as to prevent injury to workmen or persons who, by the reason of the nature of their employment, are liable to come in contact with, or in close proximity to the wheels, pulleys, and shafting, when, as often happens, their clothing is caught by the rotating parts, and they are badly, if not fatally injured; and it consists in certain peculiarities of the construction, novel arrangement and operation of the various parts thereof, as will be hereinafter more fully set forth and specifically claimed.

The principal object of the invention is to provide protecting means for pulleys, wheels and shafting, which shall be simple and inexpensive in construction, strong, durable and efficient in operation, and so made that it can be readily supported in such a manner as to surround the shafting and protect the sides of the pulleys or wheels without removing the shafting from its hangers or the pulleys or wheels from the shafts.

In order to enable others skilled in the art to which my invention pertains, to make and use the same, I will now proceed to describe it, referring to the accompanying drawing, in which—

Figure 1, is a view partly in section and partly in elevation of a pulley and shaft protector embodying the invention; Fig. 2, is a similar view taken on line 2—2 of Fig. 1, looking in the direction indicated by the arrows; and Fig. 3, is a face view of a portion of the protecting shield for the pulley, showing the recesses in its meeting edges for the reception of securing bolts.

Like numerals of reference, refer to corresponding parts throughout the different views of the drawing.

The reference numeral 5, designates a portion of a shaft, which may be journaled in suitable hangers 6, one only of which is shown, and which hangers may be of the ordinary or any preferred construction, and as usual, suspended from an overhead support. Mounted on the shaft 5, is a pulley or wheel 7, of the ordinary or any preferred construction. Surrounding the shaft 5, and extending from the hanger 6, to a point near the pulley 7, is a split sleeve 8, which is supported at one of its ends by means of an adjustable hanger which comprises two pieces 9, and 10, the former being provided with a longitudinally extended slot 11, and the latter with a number of openings for the reception of bolts 12, which are screw-threaded on one of their ends and provided with heads or enlargements on their other ends. These bolts are extended through openings in the piece or member 10, and through the slot 11, in the piece or member 9, and have on their screw-threaded ends, nuts 13, to secure said members together in the desired position. The lower end of the member 9, is provided with a segmental or semi-circular portion 14, to fit around the upper surface of the sleeve 8, and said portion has at each of its free ends a laterally extended projection 15, each of which is provided with an opening to receive a bolt 16, used for securing the lateral extensions 17, of a semi-circular portion 18, to the part 14, thereby furnishing a bearing or support for the sleeve 8, near the hanger 6, for the shafting. Near the pulley 7, another adjustable hanger of the same construction as just above described is suspended from the overhead support 19, for the purpose of supporting the other end of the sleeve 8, as well as the shield 20, which protects the pulley 7, at one of its sides. This shield is made of two semi-circular pieces, each of which has at its meeting edge, a pair of recesses 21, which are located near the periphery of the shield, and as is clearly shown in Fig. 2, of the drawings, said recesses, when the pieces of the shield are approximated, register with one another and form an opening having a reduced portion which extends outwardly or toward the periphery of the shield. By this construction it is evident that a bolt 12, with a nut 13, thereon, may be passed through each of the enlarged portions of the recesses 21, and then slid into the reduced portion at which point the nut may be tightened so as to cause it and the head of the bolt to clamp the meeting edges of the shield, and thus firmly hold them together. Each of the pieces of the shield is provided at the middle of its straight or meeting edge with a recess 22, through which the shaft 5, is extended.

Secured to the surface of the shield 20, opposite that from the pulley 7, are two semi-circular plates 23, each of which is provided with a lateral extension 24, each of which is curved in cross-section to fit loosely around the shaft 5, and to fit in the bearing formed by the members 14, and 18, on the adjustable hanger which supports the shield. As shown in Fig. 1, each of the extensions 24, has a reduced portion 25, which is also curved in cross section to fit loosely around the shaft 5, and within the end of the sleeve 8, adjacent to the shield. Secured around the end of the sleeve 8, which engages the reduced portions 25, of the extensions 24, is a split ring 26, which is formed of two semi-circular pieces, each of which has at each of its ends an apertured lug 27, to receive bolts 28, used for securing them together around the sleeve.

From the foregoing and by reference to the drawing, it will be seen and clearly understood that as the sleeve 8, is split, and the portions 18, are detachable from the parts 14, of the adjustable hangers, and that as the shield 20, and the plates 23, with the extensions 24, thereon are also split, the parts may be assembled around the shaft without removing the same from its bearings or hangers, and that when the parts are secured in the positions shown in Fig. 1, of the drawing, and above described, that the shaft, as well as the pulley will be protected thereby. Of course, if desired, a shield 20, may be located on each side of the pulley and the entire shaft may be surrounded with a protecting sleeve.

Having thus fully described my invention what I claim as new and desire to secure by Letters-Patent is—

1. In a device of the character described, the combination with a plurality of adjustable hangers each having at its lower end a detachable bearing, of a split sleeve located at one of its ends within the bearing of one of said hangers, a shield consisting of two semi-circular pieces and located near the other end of said sleeve, a pair of semi-circular plates secured centrally to the pieces of the shield and each having an extension provided with a reduced portion, said extensions being located in the bearing of another one of the hangers and the reduced portion of said extensions being located in the end of the split sleeve adjacent to the last named hanger, a split ring detachably secured around the sleeve and said reduced portion, and means to detachably connect the pieces of the shield together.

2. In a device of the character described, the combination with a plurality of adjustable hangers each having at its lower end a detachable bearing, of a split sleeve located near one of its ends within the bearing of one of said hangers, a shield consisting of two semi-circular pieces having recesses provided with reduced portions in their meeting edges, a pair of semi-circular plates centrally secured to the pieces of the shield and each having an extension provided with a reduced portion, said extensions being located in the bearing of another one of the hangers, the reduced portion of said extensions being located in the end of the split sleeve adjacent to the last named hanger, a split ring detachably secured around the sleeve and said reduced portions, and clamping bolts located in the recesses of the pieces of the shield to detachably secure them together.

PETER BLOMSTROM.

Witnesses:
CHAS. C. TILLMAN,
AUGUST BLOMSTROM.